(12) United States Patent
Bozionek et al.

(10) Patent No.: US 8,483,666 B2
(45) Date of Patent: Jul. 9, 2013

(54) METHOD, TERMINAL AND VOICE MEMORY FOR STORING VOICE MESSAGES IN A COMMUNICATION NETWORK

(75) Inventors: Bruno Bozionek, Borchen (DE); Karl Klaghofer, Munich (DE); Holger Prange, Munich (DE); Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 258 days.

(21) Appl. No.: 12/665,044

(22) PCT Filed: Jun. 2, 2008

(86) PCT No.: PCT/EP2008/056779
§ 371 (c)(1),
(2), (4) Date: May 14, 2010

(87) PCT Pub. No.: WO2008/155210
PCT Pub. Date: Dec. 24, 2008

(65) Prior Publication Data
US 2010/0255818 A1    Oct. 7, 2010

(30) Foreign Application Priority Data
Jun. 21, 2007    (DE) .......................... 10 2007 028 640

(51) Int. Cl.
*H04M 11/10*    (2006.01)
(52) U.S. Cl.
USPC ...................................... 455/413; 455/414.1
(58) Field of Classification Search
USPC ............................................. 455/413, 414.1
See application file for complete search history.

(56) References Cited

U.S. PATENT DOCUMENTS 7,167,468 B2    1/2007 Donovan
7,599,355 B2 *  10/2009 Sunstrum ...................... 370/352
(Continued)

FOREIGN PATENT DOCUMENTS

CN    1875609 A    12/2006
EP    1248486 A2   10/2002
(Continued)

OTHER PUBLICATIONS

International Preliminary Report on Patentability for PCT/EP2008/056779 dated Jan. 12, 2010 (Form PCT/IB/373 and PCT/ISA/237).
(Continued)

*Primary Examiner* — Barry Taylor
(74) *Attorney, Agent, or Firm* — Buchanan Ingersoll & Rooney PC

(57) ABSTRACT

After the input of a subscriber (TLN1) of the first terminal (EG1), a connection to a temporarily available voice memory (SPS) is signalized by the same, and subsequently a voice message (spn) and at least one piece of retrieval information (ai) identifying the second terminal (EG2) is transmitted and stored at that location. Subsequently, the connection is terminated and the second terminal (EG2) is informed of the presence of a retrievable voice message (spn) in the voice memory (SPS) via the voice memory (SPS) by means of the at least one piece of retrieval information (ai), and the voice message (spn) can be retrieved from the second terminal (EG2) by means of the transmitted retrieval information (ai), or is transmitted to the second terminal (EG2) by the voice memory (SPS). In this manner voice messages (spn) can be stored for terminals (EG2) and retrieved by the same, regardless of whether one or no voice memories—such as an answering machine—is associated with these terminals (EG2).

18 Claims, 3 Drawing Sheets

U.S. PATENT DOCUMENTS

| | | | |
|---|---|---|---|
| 2004/0247097 A1* | 12/2004 | Dillard et al. | 379/88.22 |
| 2005/0020250 A1* | 1/2005 | Chaddha et al. | 455/414.1 |
| 2005/0036482 A1* | 2/2005 | Goroshevsky et al. | 370/352 |
| 2005/0152515 A1* | 7/2005 | Amir et al. | 379/88.13 |
| 2005/0153729 A1* | 7/2005 | Logan et al. | 455/550.1 |
| 2005/0245239 A1 | 11/2005 | Haumont et al. | |
| 2005/0286519 A1 | 12/2005 | Ravikumar et al. | |
| 2007/0121816 A1* | 5/2007 | Bauchot et al. | 379/88.12 |
| 2008/0167028 A1* | 7/2008 | Gintz | 455/419 |
| 2008/0181141 A1* | 7/2008 | Krantz et al. | 370/271 |
| 2009/0117880 A1* | 5/2009 | Sipher | 455/412.2 |

FOREIGN PATENT DOCUMENTS

| | | |
|---|---|---|
| EP | 1635551 A1 | 3/2006 |
| WO | 2005/018211 A1 | 2/2005 |

OTHER PUBLICATIONS

International Search Report for PCT/EP2008/056779 (PCT/ISA/210) (English Translation), Nov. 17, 2009.

Written Opinion of the International Searching Authority for PCT/EP2008/056779, Nov. 17, 2009.

\* cited by examiner

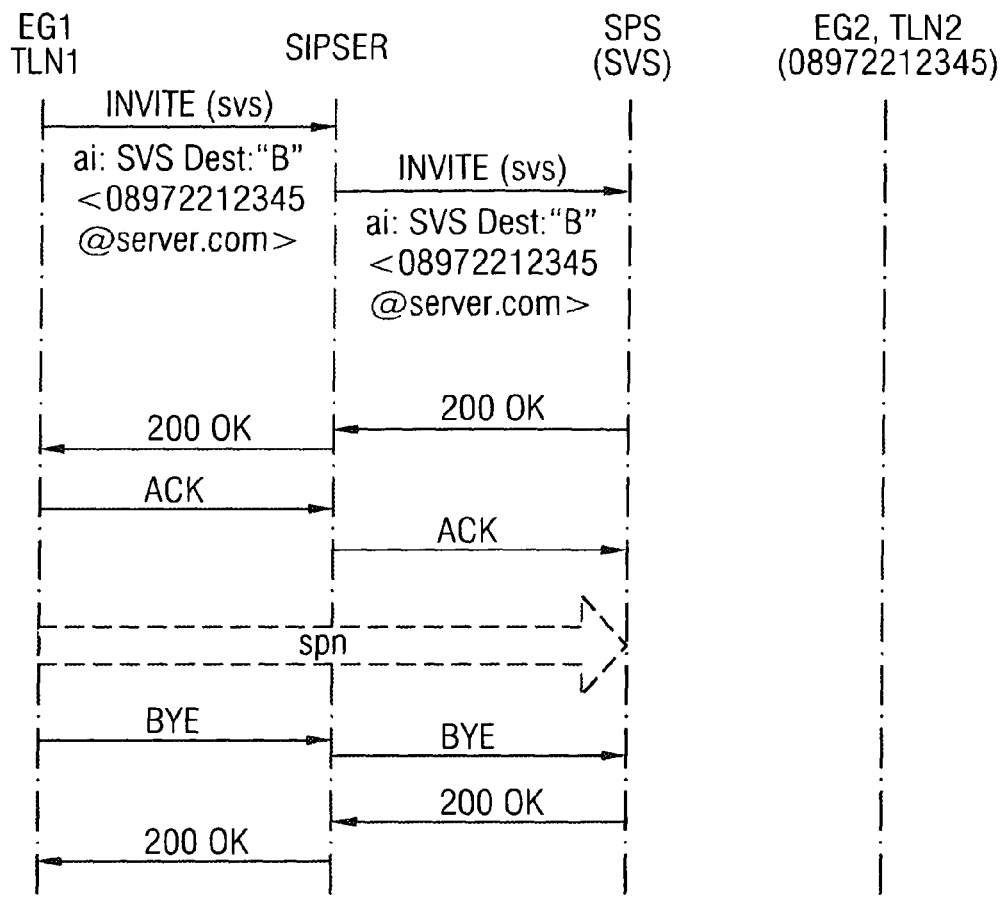
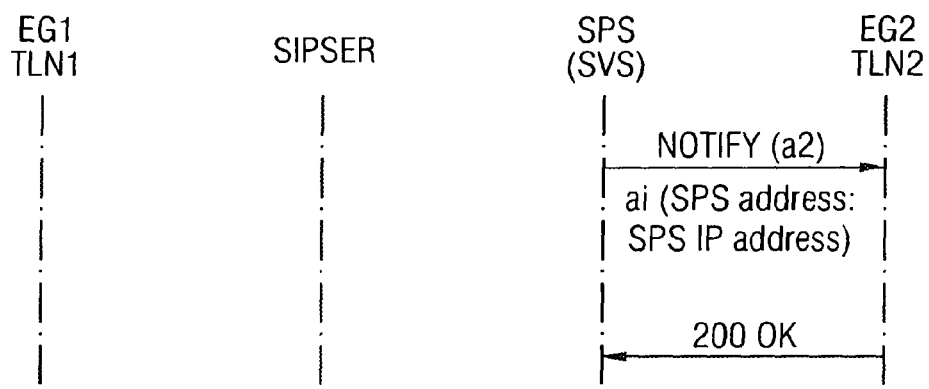

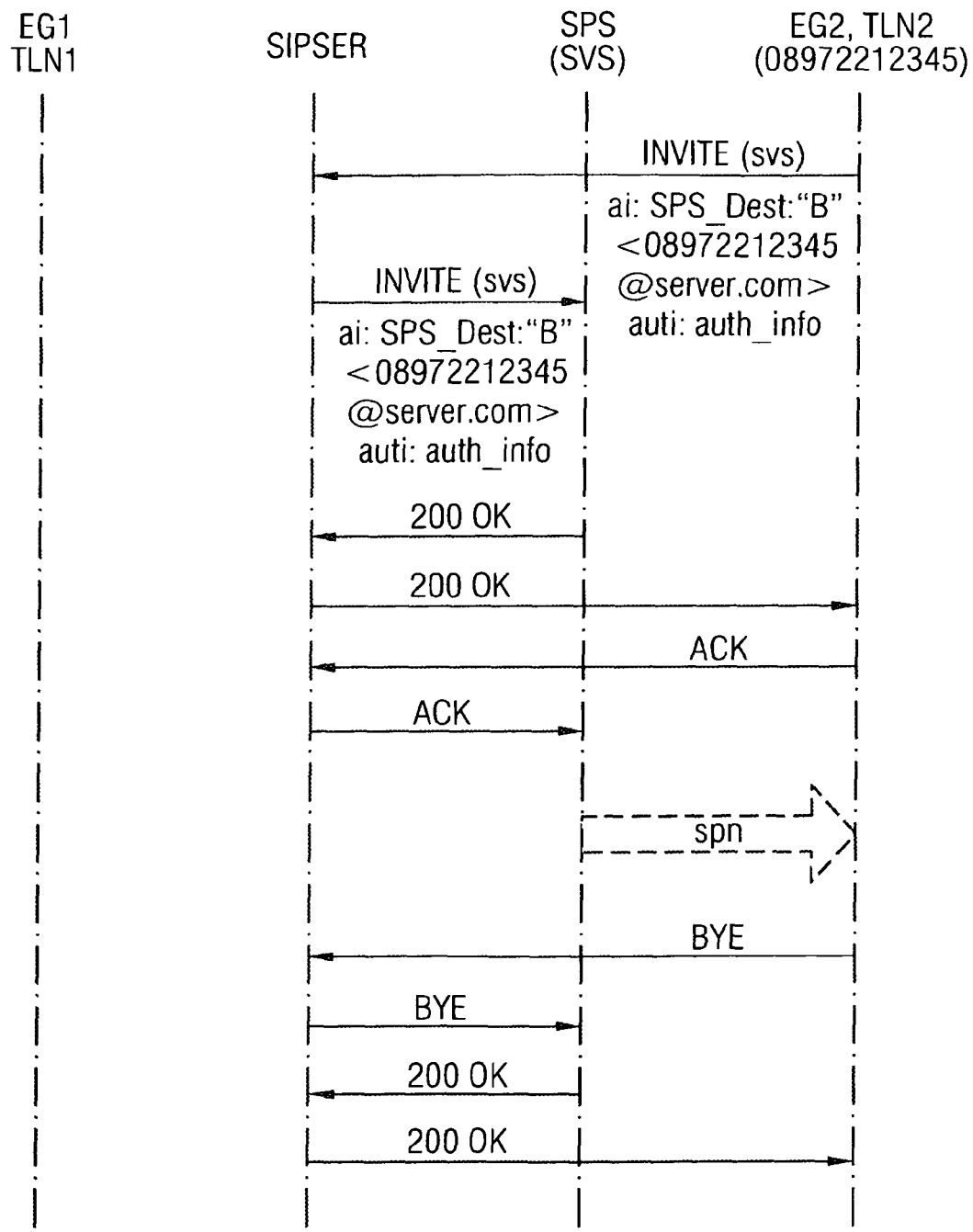

METHOD, TERMINAL AND VOICE MEMORY FOR STORING VOICE MESSAGES IN A COMMUNICATION NETWORK

CROSS-REFERENCE TO RELATED APPLICATIONS

This application is the United States national phase under 35 U.S.C. §371 of International Application No. PCT/EP2008/056779 filed on Jun. 2, 2008, and claiming priority to German Application No. 10 2007 028 640.8 filed on Jun. 21, 2007. Those applications are incorporated by reference herein.

BACKGROUND OF THE INVENTION

Embodiments of the invention are directed to improving the transfer of voice messages to terminals.

BACKGROUND OF THE ART

In communication networks such as PSTNs or packet-oriented intranet or Internet, a voice memory device can be permanently associated with a terminal. This is done so that a voice message can be left even when the terminal and its associated subscriber cannot be reached. In this configuration, the voice memory—also known as an answering machine—is placed on standby by the subscriber. When a voice memory associated with a terminal is on standby, a call to that terminal activates the voice memory or switches on the answering machine at the subscriber's location, either immediately or after a few rings. After playing a greeting to the calling terminal, the voice memory is placed into a mode in which it can receive and store voice messages from the calling terminal. This type of voice memory can either be assigned to an individual terminal or used in a communication network in such a way that the voice memory is associated with a particular terminal.

If no voice memory is associated with a called terminal, it is currently not possible to transfer a voice message to the called terminal if the called subscriber cannot be reached. In order to inform the called subscriber of the desire to make a connection or exchange voice information, provided that the communication network permits it, an "automatic callback" or "message waiting callback" command feature can be activated. For both of these command features, when the called subscriber is available at his terminal, either a callback to the calling terminal is initiated automatically, provided that the called subscriber's terminal is active, or information is displayed for him indicating that he should call the calling subscriber back. However, a callback resulting from either of these command features can fail again if the subscriber at the terminal that made the original call is not available or cannot be reached. It is currently not possible with either of these command features to transmit a voice message to the called subscriber.

BRIEF SUMMARY OF THE INVENTION

The significant aspect of the invented process lies in the fact that, after an input by the subscriber at a first terminal, that terminal signals a connection to a temporarily available voice memory on the communication network, and a voice message and at least one piece of retrieval information that identifies a second terminal is transferred and is stored there after the connection is terminated. The second terminal is informed by the voice memory, using at least one piece of retrieval information, that a retrievable voice message is available in the voice memory, and the voice message can be retrieved by the second terminal using the transferred retrieval information or it is sent by the voice memory to the second terminal.

An important advantage of the invention lies in the fact that a voice message for a called subscriber is stored in a temporarily available voice memory and a piece of information about the stored message can be sent to the called subscriber, regardless of whether or not a voice memory is associated with that subscriber. The voice message can either be retrieved by the called subscriber or sent by the voice memory to the called subscriber. Having this dynamic temporary availability of an unassociated but still addressable voice memory in the communication network, or even in the calling terminal, makes it possible to use a voice memory in a very flexible and practical manner, such that the terminal can be reached no matter what its availability status is, and no repeated connection attempts are necessary.

In one advantageous further development of the invented process, when a connection signal is sent by a first terminal to a second terminal, the first and/or second terminal and/or the communication network determines that the second terminal has no associated voice memory, and subsequently a connection is signaled to the temporarily available voice memory, either automatically or based on subscriber input. In this case, a connection to the temporarily available voice memory is not signaled until after it is determined that the second terminal has no associated voice memory.

In another advantageous example of the invention, the second terminal is informed by the communication network or the subscriber associated with the second terminal is informed by other communication networks that a retrievable voice message is available. This can be accomplished on a packet-oriented network by means of an e-mail message or a "message waiting" message, or on a wireless communication network by means of an SMS message, with the voice memory configured for access to packet-oriented, timeslot-oriented, and wireless communication networks. The retrieval information is preferably represented by a telephone number on a timeslot-oriented communication network, by a communication network address such as an internet address or e-mail address on a packet-oriented communication network, or by a mobile wireless telephone number on a mobile wireless communication network. Preferably, the retrieval information can also contain a piece of authentication information, which is used for an authentication procedure when the voice message is retrieved. The information to the second terminal or its subscriber can therefore be very flexible—i.e., it can come from different types of communication networks and their terminals—such that subscribers can readily be reached via fixed network terminals, TDM networks, or the Internet or an intranet, as well as mobile terminals on wireless networks.

According to another advantageous example of the invention, when the connection is signaled by the first terminal, the temporarily usable voice memory is selected from a voice memory pool; or, when the connection is signaled by the first terminal, the voice memory of the first terminal is selected by the first terminal for temporary use, and the voice memory for the first terminal is configured in such a way that, by using the transmitted terminal identification, the second terminal can be informed of the availability of a stored voice message and/or the stored voice message can be transmitted to the second terminal. According to the invention, this means that in the communication network there is a pool of voice memories, or one high-capacity voice memory, or even the first terminal's voice memory (if it has one), that are used temporarily for interim storage of a voice message and then, after transmitting that voice message to the second terminal, are free again and available to other terminals or their subscribers for interim storage of voice messages.

Preferably, the connection signal from the first terminal to the temporarily usable voice memory can be initiated when ringing the second terminal, or when ringing the second terminal with a notification that no voice memory is associated with the second terminal, or when the second terminal is busy, or during a conversation with it, or when no connection can be established with the second terminal. In all variations, the connection signal from the first to the second terminal is finally terminated and a connection to the voice memory is initiated in the communication network or in the particular terminal.

According to another example of the invention, a piece of retrieval information is transmitted to the second terminal or to the subscriber associated with the second terminal, as part of the information regarding the existence of a retrievable voice message, such that a network-specific address and/or telephone number as well as a message-specific identification for retrieving the stored voice information from the voice memory via a communication network is provided in the retrieval information. The address can be a telephone number for a TDM-oriented communication network such as a mobile wireless network or cabled telephone network, or can be an Internet or intranet address on the Internet or an intranet configured for voice transmission.

Additional advantageous further developments of the invented process and an example of a terminal, a voice memory, and a communication system according to the invention can be found below in the claims.

BRIEF DESCRIPTION OF THE FIGURES

In the following text, the invention and its examples are described in detail with reference to two schematic diagrams. They show.

DETAILED DESCRIPTION OF THE INVENTION

Figure 1:
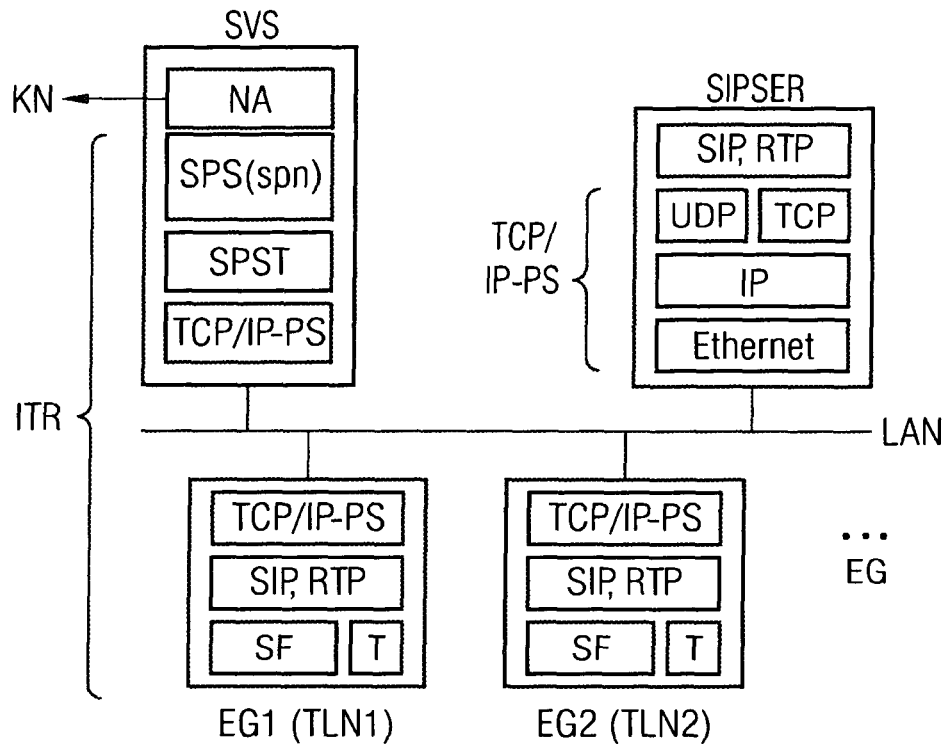
FIG. 1 a schematic diagram of a communication system using the invented process, and FIGS. 2a to 2d a flow diagram explaining the invented process, based on the communication system in FIG. 1.
Figure 2A:
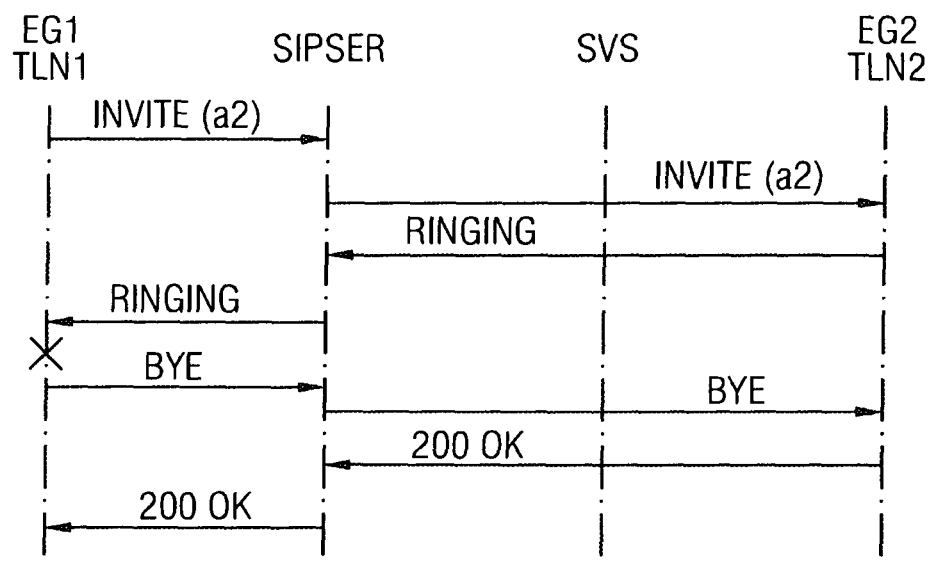

FIG. 1 shows a communication system with a communication network such as might be used for an intranet ITR. Other communication networks, such as the Internet or time-multiplex-oriented networks are also possible. The intranet ITR is set up using a local network LAN or an Ethernet, to which multiple terminals EG and two servers SVS and SIPSER are connected (shown by a dotted line). As an example, two terminals EG1 and EG2 are shown, which can consist of a telephone with an Ethernet connection or a personal computer with an Ethernet connection and voice capability SF.

For voice capability SF on the intranet ITR, the Session Initial Protocol SIP according to RFC standard RFC3261 is used in the application layer together with SIP extension RFCs, e.g., RFC3265, which expand the SIP standard to include the SIP NOTIFY methods used, and the SIP protocol controls the signaling of a voice connection; in FIG. 1 the SIP server SIPSER is suggested as an example. The voice information is transmitted over the local network preferably with the Real-time Transport Protocol RTP, or as an option with the Secure Real-time Transport Protocol SRTP, in such a way that these protocols are used in conventional fashion for direct transmission of voice messages, i.e., without involving the SIP server SIPSER, between the terminals EG. Here it is assumed that no other network elements, such as media proxies or a session border controller, are redirecting the RTP flow. To transmit voice messages and signaling information through the local network LAN, additional protocol layers are required, which are shown assembled in a TCP/IP protocol bundle TCP/IP-PS. This includes, in particular, the User Data Protocol UDP and the Transmission Control Protocol TCP in the transport layer, as well as the Internet Protocol IP (IP4 or IP6) in the Internet layer. In the following network layer, the Internet layer is procedurally and physically configured to fit the local network LAN using the Ethernet protocol Ethernet. These aforementioned protocol layers and physical configurations for the network are applied not only in the SIP server SIPSER but also in the terminals EG and in a storage server SVS (represented in FIG. 1 by the designation TCP/IP-PS), and the connection signaling or the establishment of a virtual connection between the first and second terminals EG1 and EG2 is controlled in the SIP server SIPSER.

The terminals EG have voice capability SF in addition to the TCP/IP protocol bundle TCP/IP-PS, wherein the voice information is carried through a microphone and a speaker (not shown) and through corresponding physical connections and connecting functions to the SIP protocol SIP and to the RTP or SRTP protocol.

In the storage server SVS, in addition to the protocol bundle TCP/IP-PS, there is a voice memory controller SPST, a voice memory SPS, and an optional network adaptor unit NA. Using the voice memory controller SPST, voice messages spn transmitted with the SIP protocol as an RTP (or SRTP) data stream to the voice memory SPS are controlled and stored there, and voice messages spn read from the voice memory SPS as RTP (or SRTP) data streams are directed to their respective terminals (i.e., EG2).

As an example, the voice memory SPS consists of a pool of shared voice memories with a predetermined storage capacity (not shown), such that a voice message spn to be stored, depending on its size, is assigned to a suitable number of shared voice memories. Alternatively, the voice memories SPS can consist of a single voice memory with high storage capacity, such that a voice message spn to be stored is assigned to the required shared storage space in the voice memory SPS.

Additionally, there is a network adaptor unit NA in the voice memory SPS, which can make connections to the various networks, such as a network connection to a mobile wireless network or telephone network, for example. This requires a protocol adaptation as well as adjustment of the physical characteristics for the communication networks, such as a suitable wireless unit for accessing a wireless communication network, for example.

In FIGS. 2a to 2d, the invented process is explained using a broken down flow diagram, assuming a communication system configured as in FIG. 1. The first and second terminals EG1 and EG2, the SIP server SIPSER, and the storage server SVS are each represented in the flow diagrams by a vertical dash-dot line. For this execution example, it is also assumed that the first terminal EG1 initiates a connection signal to the second terminal EG2 with the goal of achieving a voice connection.

As part of the connection signaling process, the first terminal EG1 transmits an invite message INVITE to the SIP server SIPSER using the SIP protocol SIP, and the address a2 of the second terminal EG2 is included in the invite message INVITE. When the SIP protocol is used, the address a2 is provided preferably as a SIP URI such as "sip:+

49811234567@domain." A SIP URI is used for addressing participants in SIP-based conversations. Here it would concern the SIP telephone number of a subscriber using the notation already known from e-mail addresses. Alternatively, the address can be provided in URI format, "sip: user@domain," or as a telephone URI such as "tel:+ 49811234567," and the address can be converted into an SIP URI.

A SIP server SIPSER is the main component of an IP-based network or an intranet ITR for voice transmission, wherein all of the SIP calls for the network are processed in the SIP server SIPSER. A SIP server controls the transfer of calls from terminals EG to other terminals or to other servers or network transfer devices (not shown). Concerning the execution example, an invite message INVITE with the address a2 of the second terminal EG2 is generated in the SIP server SIPSER and sent to the local network LAN. The second terminal EG2 recognizes that the invite message INVITE is addressed to it and therefore generates a ring or other call signal that is emitted by the second terminal EG2. According to the SIP protocol, when the ring is generated, a ringing message 180 Ringing is produced and sent through the SIP server SIPSER to the first terminal EG1.

For the execution example it is further assumed that the subscriber TLN2 for the second terminal EG2 is not available, so the call from the first terminal EG1 is not received. In addition, a piece of information could be generated by the SIP server SIPSER or by the second terminal EG2, stating that no voice memory is associated with the second terminal EG2, and this piece of information will be sent to the first terminal EG1. Because there is no conventional way to leave a voice message spn for the second terminal EG2, according to the invention a connection signal is initiated and sent to the storage server SVS with the address of the voice memory SPS. This signal is initiated, for example, by pressing a special voice memory key T on the first terminal EG1, which may be a mechanical, electronic, or touch-screen key. Alternatively, the connection signal can be initiated by selecting a menu entry using the available telephone keys. The connection signal to the storage server SVS can also be initiated automatically; i.e., after it is determined that no voice memory is associated with the second terminal EG2, the first terminal EG1 can automatically initiate the connection signal to the storage server SVS without any input from the first subscriber (such as pressing a special key).

For the following descriptions, it is assumed that the Offer-Answer model according to RFC3264 and other RFCs is used for the SIP and SDP, and that the configuration of this Offer-Answer model includes the parameters for transmitting the voice flow.

After the voice memory function is selected—by activating the voice memory key T, for example—the connection signal to the second terminal EG2 is terminated by generating and transmitting a SIP-compliant BYE message BYE. The conventional way to do this is for the appropriate BYE message BYE to be generated in the first terminal EG1 and sent through the SIP server SIPSER to the second terminal EG2. In SIP-compliant format, the BYE message BYE is confirmed by a 200 OK message 200 OK transmitted to the SIP server SIPSER by the second terminal EG2, and after transmission of a 200 OK message 200 OK sent to the first terminal EG1, the connection signal is terminated in the affected terminals EG1 and EG2 and in the SIP server SIPSER.

Selecting the voice memory function or activating the voice memory key T could also take place after termination of the connection signal according to SIP format, and in this case the address a2 of the second terminal must be available in order for the invented process to continue. The voice memory function could also be selected even without any connection signal from the first to the second terminal EG1 and EG2. This is advantageous if a voice message spn needs to be stored in the temporarily available storage server SVS regardless of whether or not a voice memory is associated with the second terminal EG2 or the called terminal, or whether the first subscriber TLN1 knows that no voice memory is associated with the second terminal EG2.

After selection of the voice memory function, the connection signal to the storage server SVS is initiated (see FIG. 2b). Here, according to the SIP protocol SIP, an invite message INVITE is sent to the SIP server SIPSER, and the address sps of the storage server SVS is included in the invite message INVITE as the addressing element (i.e., as a URI request). In addition, a piece of retrieval information ai is included in the invite message INVITE. For this execution example, a piece of retrieval information ai could be: SVS_Dest: "EG2"<08972212345@Server.com>. By means of the addressing element and this retrieval information ai, the SIP server SIPSER is told that the connection signal to the storage server SVS should be forwarded with the supplied address sys and the retrieval information ai. In this case, a new invite message INVITE with the same address sys of the storage server SVS is generated in the SIP server SIPSER and transmitted in the local network LAN. Based on the address sys supplied, the storage server SVS recognizes that the connection signal is intended for it. The connection signal or call is received in the storage server SVS, which generates a 200 OK message 200 OK and sends it to the SIP server SIPSER to indicate that the call was received. The 200 OK message 200 OK is forwarded from the SIP server SIPSER through the local network LAN to the first terminal EG1. In the first terminal EG1, a SIP-compliant Ack message ACK is generated and sent through the local network LAN and through the SIP server SIPSER to confirm receipt of the call. By means of the supplied retrieval information ai, the storage server SVS is told that a voice message spn transmitted from the first terminal EG1 should be stored in the voice memory SPS for the second subscriber TLN2 on the second terminal EG2.

After the connection—one session according to SIP protocol—is signaled through the SIP server SIPSER from the first terminal EG1 to the storage server SVS, a voice message spn input or spoken by the first subscriber TLN1 on the first terminal EG1 is transmitted through the local network LAN to the storage server SVS. In the storage server SVS, the voice message spn is directed to the voice memory SPS through the TCP-IP protocol bundle TCP/IP-PS using the voice memory controller SPST and the RTP protocol. In this case, the voice memory controller SPST controls the readiness of the shared memory or alternatively the storage space to be prepared for the transmitted voice message spn. The voice message spn is transmitted in SIP-compliant format using the RTP (Real-time Transmission Protocol) or SRTP, i.e., the voice message spn is sent directly from the first terminal EG1 to the storage server SVS in the voice memory SPS. Alternatively, media proxies or a session border controller can be included in the transfer, such that the voice message would not be sent directly, but rather through these units.

After transmission of the voice message spn, the connection or session is terminated by an SIP-compliant BYE message BYE being generated in the first terminal EG1 and sent through the SIP server SIPSER to the storage server SVS. In SIP-compliant form, the BYE message BYE is confirmed by a 200 OK message 200 OK sent through the SIP server SIPSER to the first terminal EG1, which terminates the connection in the first terminal EG1 and in the SIP server SIPSER and the storage server SVS.

After the connection between the first terminal EG1 and the storage server SVS is terminated, according to the invention the second terminal EG2 is informed of the existence of a voice message spn stored in the voice server SPS. In SIP-compliant form, a notify message NOTIFY is then generated in the storage server SVS and sent through the local network LAN, and possibly through the SIP server SIPSER, to the second terminal EG2. Alternatively, a new or different SIP message can be used, such as PUBLISH or INFO, or even SIGNAL, for example, with the message being generated in the storage server SVS.

In addition to the address a2 of the second terminal EG2 as the addressing element (i.e., the URI request), the notify message NOTIFY also contains the address sys (SVS address: SVS IP address) or domain name that indicates the IP address of the voice server SVS or even the domain name of the storage server SVS in which a voice message spn for the second terminal EG2 has been placed or stored and can be retrieved. Next, in SIP-compliant form, the notify message NOTIFY is confirmed by a 200 OK message 200 OK sent to the storage server SVS. At this point, the terminal EG2 can turn on a Message Waiting Indication lamp or can inform the subscriber TLN2, by means of the display or an alert tone or voice message embedded in the voice current, that there is a voice message spn. Another possibility is for the subscriber TLN2 to be told how many messages there are, the telephone numbers or even the names of the subscribers who left the voice messages spn.

The flow diagram in FIG. 2d shows an execution example of the invention wherein the voice message spn is received or transmitted by the storage server SVS through the second terminal EG2.

When the second subscriber TLN2 is available or present, he initiates a connection signal to the storage server SVS from the second terminal EG2 (see FIG. 2d). According to the SIP protocol SIP, this transmits an invite message INVITE to the storage server SVS—and possibly also through the SIP server SIPSER—with the transmitted address sys of the storage server SVS included as the addressing element, i.e., as a URI request, in the invite message INVITE. In addition, a piece of retrieval information ai=SVS_Dest:"B" 08972212345@server.com is included in the invite message INVITE, with which the voice message spn can be retrieved from the voice memory SPS only by the correct terminal, i.e., the second terminal EG2. In the storage server SVS, the connection signal or call is received, and a resulting 200 OK message 200 OK is generated and sent to the second terminal EG2 to indicate receipt of the call. In the second terminal EG2, a resulting SIP-compliant Ack message ACK is generated and sent through the local network LAN and the SIP server SIPSER to confirm receipt of the call.

In order to be sure that the correct terminal EG2 is authorized to retrieve the stored voice message spn, an authentication procedure AUT can also be run with a piece of authentication information auti that specifically identifies the second terminal EG2 or is otherwise appropriate, indicated in FIG. 2d by the designation AUT (auti).

After the connection or session from the second terminal EG1 to the storage server SVS is established, in the storage server SVS, using the transmitted retrieval information ai and the voice memory controller SPST, the voice message spn is located in the voice memory SPS, read out, and sent through the TCP/IP protocol bundle TCP/IP-PS and the local network LAN to the second terminal EG2, shown in FIG. 2d by an arrow marked with spn. In SIP-compliant form, the voice message spn is sent using the RTP (Real-time Transmission Protocol) or SRTP protocol, and the port addresses required for this are sent through the SIP protocol—including the SIP Extension Protocols such as RFC3264—Offer/Answer handling, or the SDP protocol.

After the voice message spn is transmitted, termination of the connection is initiated by an SIP-compliant BYE message BYE being generated in the second terminal EG2 and sent to the storage server SVS, through the SIP server SIPSER if necessary. In SIP-compliant form, the BYE message BYE is confirmed by a 200 OK message 200 OK sent through the storage server SVS to the second terminal EG2, which causes the connection to be terminated in the second terminal EG2 and in the storage server SVS.

Alternatively, the voice message spn can also be sent to the second terminal EG2 through a connection initiated by the storage server SVS, with the invite message INVITE sent to the SIP server SIPSER. The SIP server SIPSER then forwards this message to the second terminal EG2. The voice message spn can also be sent by the storage server SVS through other communication networks, such as via a mobile wireless network to mobile terminals, for example. In this case, it is advantageous for the storage server SVS to have suitable network adaptor equipment NA, used to access another communication network and illustrated in FIG. 1 with a rectangle marked NA and an arrow marked KN.

According to another alternative, the voice message spn can be converted into a text message, such as e-mail, and sent to a terminal for the second subscriber TLN2 that can only receive text (not shown in the figures). An example of this would be a terminal consisting of a personal computer with no telephone function, but which can receive e-mails via the Internet or intranet ITR.

According to an advantageous further development, the subscriber TLN2 for the second terminal EG2 can even be informed of the existence of a voice message spn in the storage server SVS though other communication networks. This requires the use of a network adaptor unit NA such that the retrieval information ai is sent, for example, through a wireless communication network—e.g., GSM, WLAN, UMTS—to a mobile terminal for the second subscriber TLN2 or through a cabled telephone network—in particular a digital telephone network—to a remote terminal for the second subscriber TLN2 (not shown).

According to a further alternative for the invention, the temporarily available voice memory SPS can even be used as a voice memory that is already in or associated with the first terminal EG1. In this case, the voice memory in the first terminal EG1 is of a type such that voice messages spn for other terminals EG can be stored in it, and the voice memory according to the invention can inform another terminal EG, such as the second terminal EG2, over the intranet ITR or another communication network KN, that there is a voice message stored in this terminal EG. In addition, the voice memory of the first terminal EG1 or the first terminal EG1 itself can be of a type such that a remote terminal EG or the second terminal EG2 can retrieve the voice message spn stored for it, regardless of whether or not the subscriber TLN1 for the first terminal EG1 is available. This means that the voice memory for the first terminal EG1 or the first terminal EG1 itself must be of a type such that a call from the second terminal EG2 for the purpose of retrieving a voice message spn stored for the second terminal EG2 is automatically answered, and the voice memory spn is automatically read out of the voice memory and sent to the second terminal EG2.

The invention claimed is:

1. A method for storing voice messages in a communication network for potential transmission or retrieval, the method comprising:
 a first terminal sending a signaling message to a first server for initiating a communication with a second terminal;
 the first terminal saving a voice message in memory, the voice message being directed to a user of the second terminal;
 the user receiving a notification message indicating that the voice message is available to the user; and
 the user utilizing at least a portion of retrieval information communicated in the notification message to access the voice message; and
 wherein the memory is memory of the first terminal and the method further comprises the first terminal transmitting the voice message to a device of the user in response to the utilization of the at least a portion of retrieval information.

2. The method of claim 1 wherein the device of the user is the second terminal and wherein the utilizing of the at least a portion of the retrieval information to access the voice message is comprised of the second terminal communicating with the first terminal to automatically retrieve the voice message from the memory of the first terminal via the at least a portion of the retrieval information.

3. The method of claim 1 wherein initiation of the saving of the voice message in the memory occurs while ringing the second terminal, with a notification that no voice memory is associated with the second terminal.

4. The method of claim 1 wherein the retrieval information is represented in an address selected from the group consisting of a telephone number, a communication network address, an Internet address, an intranet address, an e-mail address, a SIP URI address, a telephone URI address, and a mobile wireless telephone number.

5. The method of claim 1 wherein the notification message is sent to the user as one of an e-mail message, a Message Waiting message, and an SMS message.

6. The method of claim 1 wherein the notification message also comprises a piece of authentication information and wherein the retrieval information comprises a network-specific address and/or telephone number for retrieval of the stored voice message via the communication network.

7. The method of claim 1 further comprising converting the voice message into a text message and sending the text message to the user.

8. The method of claim 1 further comprising initiating the saving of the voice message by a user of the first terminal entering input by a method selected from the group consisting of pressing a voice memory key, entering prefix information, entering a network-specific address, and by selecting from a displayed menu.

9. The method of claim 1 further comprising the first server receiving the signaling message and attempting to connect the first terminal to the second terminal in response to the received signaling message.

10. A method for storing voice messages in a communication network for potential transmission or retrieval, the method comprising:
 a first terminal sending a signaling message to a first server for initiating a communication with a second terminal;
 the first terminal saving a voice message in memory, the voice message being directed to a user of the second terminal;
 the user receiving a notification message indicating that the voice message is available to the user; and
 the user utilizing at least a portion of retrieval information communicated in the notification message to access the voice message; and
 wherein the memory in which the voice message is saved is memory of the first terminal and the method further comprising the first terminal automatically transmitting the voice message to the second terminal in response to receipt of a message from the second terminal requesting the voice message, at least a portion of the retrieval information being utilized in the message from the second terminal requesting the voice message.

11. A terminal for storing voice messages in a communication network, comprising:
 a voice message controller;
 a voice message memory, the voice message memory for storing voice messages, the voice message controller coupled to the voice message memory for controlling and storing voice messages in the voice message memory;
 the terminal receiving a voice message for a user for storing in the voice message memory, storing the voice message in the voice message memory and sending a notification message to a terminal of the user to identify the stored voice message being available for receipt by the user, the notification message having retrieval information that is usable for receipt of the voice message;
 the terminal transmitting the stored voice message for the user to the terminal of the user in response to a message from the terminal of the user that utilizes at least a portion of the retrieval information.

12. The terminal of claim 11 wherein the retrieval information is comprised of a telephone number, a communication network address, an Internet address, an intranet address, an e-mail address, a SIP URI address, a telephone URI address, or a mobile wireless telephone number.

13. The terminal of claim 11 wherein the notification message is an e-mail message, a Message Waiting message, or an SMS message.

14. The terminal of claim 11 wherein the voice message memory is a voice memory having a predetermined storage capacity or is comprised of shared voice memories.

15. The terminal of claim 11 wherein the voice message for the user is saved while ringing the terminal of the user and receiving notification that no voice memory is associated with the terminal of user.

16. A communication network comprising:
 a plurality of terminals comprising a first terminal and a second terminal;
 a first server connected to the terminals;
 the first terminal sending a signaling message to the first server for initiating a communication with a second terminal;
 the first terminal saving a voice message in memory of the first terminal, the voice message being directed to a user of the second terminal;
 the user of the second terminal receiving a notification message indicating that the voice message is available to the user;
 the voice message being accessed by the user via a communication with the first terminal that utilizes at least a portion of retrieval information communicated in the notification message.

17. The communication network of claim 16, wherein the communication network uses the SIP protocol, including SIP extension protocols that expand the SIP protocol with additional mechanisms, or the H.323 protocol, said communication network further comprising a SIP server or an H.323 server for controlling connections between the terminals and the voice memory.

18. The communication network of claim 16 wherein the first terminal transmits the voice message to the second terminal in response to receipt of a message from the second terminal utilizing at least a portion of the retrieval information, the message from the second terminal being the communication with the first terminal that utilizes at least a portion of retrieval information.

* * * * *